United States Patent
Kobayashi et al.

(10) Patent No.: US 12,333,936 B2
(45) Date of Patent: Jun. 17, 2025

(54) REMOTE MONITORING SYSTEM, TRAVELING SPEED CONTROL APPARATUS, AND TRAVELING SPEED CONTROL METHOD

(71) Applicant: NEC Corporation, Tokyo (JP)

(72) Inventors: Kosei Kobayashi, Tokyo (JP); Takanori Iwai, Tokyo (JP); Yusuke Shinohara, Tokyo (JP); Koichi Nihei, Tokyo (JP); Masayuki Sakata, Tokyo (JP); Takashi Yamane, Tokyo (JP)

(73) Assignee: NEC CORPORATION, Tokyo (JP)

(*) Notice: Subject to any disclaimer, the term of this patent is extended or adjusted under 35 U.S.C. 154(b) by 200 days.

(21) Appl. No.: 18/014,328

(22) PCT Filed: Jul. 6, 2020

(86) PCT No.: PCT/JP2020/026393
§ 371 (c)(1),
(2) Date: Jan. 3, 2023

(87) PCT Pub. No.: WO2022/009263
PCT Pub. Date: Jan. 13, 2022

(65) Prior Publication Data
US 2023/0245559 A1    Aug. 3, 2023

(51) Int. Cl.
*G08G 1/0967*    (2006.01)
*G06V 10/98*    (2022.01)
(Continued)

(52) U.S. Cl.
CPC ..... *G08G 1/096708* (2013.01); *G06V 10/993* (2022.01); *G08G 1/04* (2013.01);
(Continued)

(58) Field of Classification Search
CPC .... G08G 1/096708; G08G 1/04; G08G 1/052; G08G 1/096775; G08G 1/09;
(Continued)

(56) References Cited

U.S. PATENT DOCUMENTS 10,504,302 B1 *   12/2019   Chavez ................... H04W 4/90
10,761,542 B1 *    9/2020   Fairfield .............. G05D 1/0027
(Continued)

FOREIGN PATENT DOCUMENTS

| JP | 2016-206730 A | 12/2016 |
| JP | 2017-128277 A | 7/2017 |
| JP | 2020-003934 A | 1/2020 |

OTHER PUBLICATIONS

International Search Report for PCT Application No. PCT/JP2020/026393, mailed on Sep. 15, 2020.

*Primary Examiner* — Ashley L Redhead, Jr.

(57) ABSTRACT

A server receives video data from a moving body. A traveling speed control apparatus controls a traveling speed of the moving body. A quality monitoring unit monitors video quality of the video data received by the server. A speed upper limit calculation unit calculates, by using the video quality and a monitoring required condition of the video data, a maximum value of a traveling speed satisfying the monitoring required condition as an upper limit value of a traveling speed of the moving body. A speed control unit controls a traveling speed of the moving body to be equal to or lower than the calculated upper limit value.

18 Claims, 11 Drawing Sheets

(51) Int. Cl.
*G08G 1/04* (2006.01)
*G08G 1/052* (2006.01)
*H04N 17/00* (2006.01)

(52) U.S. Cl.
CPC ....... *G08G 1/052* (2013.01); *G08G 1/096775* (2013.01); *H04N 17/00* (2013.01)

(58) Field of Classification Search
CPC .... G06V 10/993; G06V 10/776; G06V 20/56; H04N 17/00
See application file for complete search history.

(56) References Cited

U.S. PATENT DOCUMENTS

| | | | |
|---|---|---|---|
| 2017/0132709 A1* | 5/2017 | Liu | B60W 40/09 |
| 2018/0067966 A1* | 3/2018 | Oder | G01S 15/931 |
| 2018/0155058 A1* | 6/2018 | Fenton | G08G 5/0086 |
| 2019/0375357 A1* | 12/2019 | Mezaael | B60R 16/023 |
| 2019/0394626 A1 | 12/2019 | Hitotsumatsu et al. | |
| 2020/0125868 A1* | 4/2020 | Naamani | G08G 1/146 |
| 2020/0159251 A1* | 5/2020 | Iwasaki | B60R 16/037 |
| 2020/0177841 A1* | 6/2020 | Yin | H04N 7/181 |
| 2020/0307569 A1* | 10/2020 | Yasui | B60W 30/0956 |

* cited by examiner

REMOTE MONITORING SYSTEM, TRAVELING SPEED CONTROL APPARATUS, AND TRAVELING SPEED CONTROL METHOD

This application is a National Stage Entry of PCT/JP2020/026393 filed on Jul. 6, 2020, the contents of all of which are incorporated herein by reference, in their entirety.

TECHNICAL FIELD

The present disclosure relates to a remote monitoring system, a traveling speed control apparatus, and a traveling speed control method.

BACKGROUND ART

Technological development of an automatic vehicle is being more active, and a driving test on a public road and trial operation of the automatic vehicle are being promoted domestically and internationally. In order to ensure safety of an automatic vehicle, there is an increasing need for remote monitoring of the automatic vehicle using mobile communication and remote control in occurring of an unexpected accident. In order to achieve safe and efficient remote monitoring and remote control, it is required to stably transmit a video captured by an in-vehicle camera or the like to a monitoring apparatus via a mobile network.

For video transmission from a vehicle to a monitoring apparatus, video distribution control being matched with a communication band of a mobile network, such as an adaptive bitrate (ABR) streaming technique, can be used. For example, in a moving picture experts group-dynamic adaptive streaming over hyper text transfer protocol (HTTP) (MPEG-DASH), a video is divided into units referred to as segments, and a result of encoding at a plurality of bit rates for each segment is prepared. An apparatus that receives a video can specify a bit rate of a segment to be received next according to a communication speed at a time of receiving the video. In this way, the apparatus that receives the video can receive a video with video quality being matched to the communication band of the mobile network.

Herein, as a related technique, Patent Literature 1 discloses a vehicle communication apparatus that enables preferential transmission of data required by a monitoring apparatus (control center) side according to a vehicle situation. The vehicle communication apparatus described in Patent Literature 1 acquires, as traveling data, video data captured by a front camera, a left side camera, a right side camera, a back camera, and an in-vehicle camera that are mounted on a vehicle. The vehicle communication apparatus determines a priority order of the video data captured by each camera according to a vehicle situation specified by using a vehicle state of the vehicle. The vehicle communication apparatus determines resolution, a frame rate, and the like of video data captured by each camera according to the priority order, and transmits the video data captured by each camera at the determined resolution and frame rate to the control center via a mobile network or the like.

In Patent Literature 1, the vehicle communication apparatus determines whether a communication state of the mobile network is less than a communication state (hereinafter, also referred to as a necessary communication state) necessary for transmitting transmission data regarding traveling data to be transmitted most preferentially. Herein, the necessary communication state is a communication state necessary for completing transmission of traveling data having a first priority order within a data transmission period being set in response to a speed of the vehicle. The data transmission period is set to shorter time as the speed is higher. When a communication state is less than the necessary communication state, the vehicle communication apparatus instructs a vehicle control electronic control unit (ECU) to reduce speed. Alternatively, the vehicle communication apparatus performs instruction on an automatic driving control ECU to reduce a set vehicle speed of automatic driving. The data transmission period becomes longer as the speed is reduced. Therefore, when the traveling speed decreases, the vehicle communication apparatus can complete transmission of traveling data with the highest priority within the data transmission period.

CITATION LIST

Patent Literature

[Patent Literature 1] Japanese Unexamined Patent Application Publication No. 2020-003934

SUMMARY OF INVENTION

Technical Problem

In Patent Literature 1, the vehicle communication apparatus reduces a speed of a vehicle when a communication state of the mobile network is less than a necessary communication state according to a data transmission period. However, Patent Literature 1 does not consider how much the speed is reduced. In Patent Literature 1, when the speed is reduced more than necessary, there is a problem that traveling efficiency is deteriorated. In contrast, when deceleration is insufficient, there is a problem that the deceleration is required again, and a period in which a vehicle cannot be appropriately monitored remotely becomes long.

In view of the above-described circumstances, an object of the present disclosure is to provide a remote monitoring system, a traveling speed control apparatus, and a method that are capable of controlling traveling of a moving body in such a way that remote monitoring of the moving body by using video data can be performed with predetermined accuracy even when video quality is deteriorated.

Solution to Problem

In order to achieve the above-described object, the present disclosure provides a traveling speed control apparatus including: a quality monitoring means for monitoring video quality of video data to be transmitted from a moving body to a server via a wireless communication network; a speed upper limit calculation means for calculating, by using the video quality and a monitoring required condition of the video data, a maximum value of a traveling speed that can satisfy the monitoring require condition as an upper limit value of a traveling speed of the moving body; and a speed control means for controlling a traveling speed of the moving body to be equal to or lower than the upper limit value.

The present disclosure provides a remote monitoring system including: a server configured to receive video data from a moving body via a wireless communication network; and a traveling speed control apparatus configured to control a traveling speed of the moving body. In the remote monitoring system, the traveling speed control apparatus includes: a quality monitoring means for monitoring video quality of video data received by the server; a speed upper limit calculation means for calculating, by using the video quality and a monitoring required condition of the video data, a maximum value of a traveling speed that can satisfy the monitoring required condition as an upper limit value of a traveling speed of the moving body; and a speed control means for controlling a traveling speed of the moving body to be equal to or lower than the upper limit value.

The present disclosure provides a traveling speed control method including: monitoring video quality of video data to be transmitted from a moving body to a server via a wireless communication network; calculating, by using the video quality and a monitoring required condition of the video data, a maximum value of a traveling speed that can satisfy the monitoring required condition as an upper limit value of a traveling speed of the moving body; and controlling a traveling speed of the moving body to be equal to or lower than the upper limit value.

Advantageous Effects of Invention

A remote monitoring system, a traveling speed control apparatus, and a method according to the present disclosure are able to control traveling of a moving body in such a way that remote monitoring of the moving body by using video data can be performed with predetermined accuracy even when video quality is deteriorated.

EXAMPLE EMBODIMENT

Figure 1:
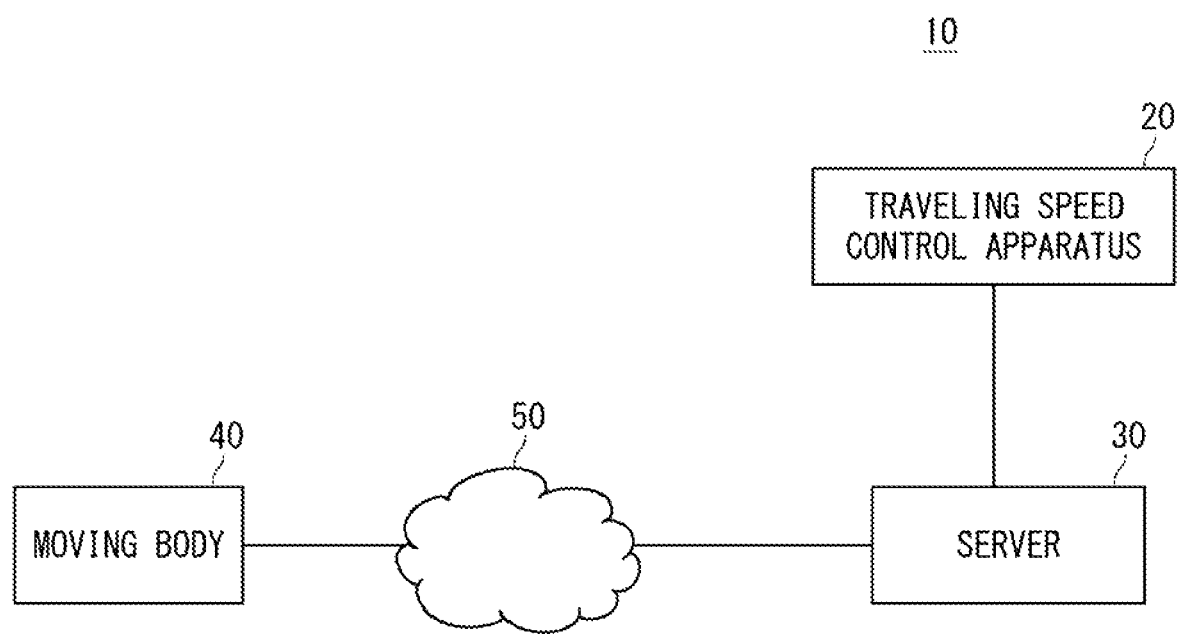
FIG. 1 is a block diagram schematically illustrating a remote monitoring system according to the present disclosure.

Prior to the description of an example embodiment of the present disclosure, an outline of the present disclosure will be described. FIG. 1 schematically illustrates a remote monitoring system according to the present disclosure. A remote monitoring system 10 includes a traveling speed control apparatus 20, a server 30, and a moving body 40. The server 30 receives video data from the moving body 40 via a wireless communication network 50. The traveling speed control apparatus 20 controls a traveling speed of the moving body 40. The traveling speed control apparatus 20 communicates with the moving body 40 via the server 30 and the wireless communication network 50, for example. The traveling speed control apparatus 20 may be a part of the server 30. Alternatively, the traveling speed control apparatus 20 may be mounted on the moving body 40, and may control the moving body 40 without passing through the wireless communication network 50.

Figure 2:
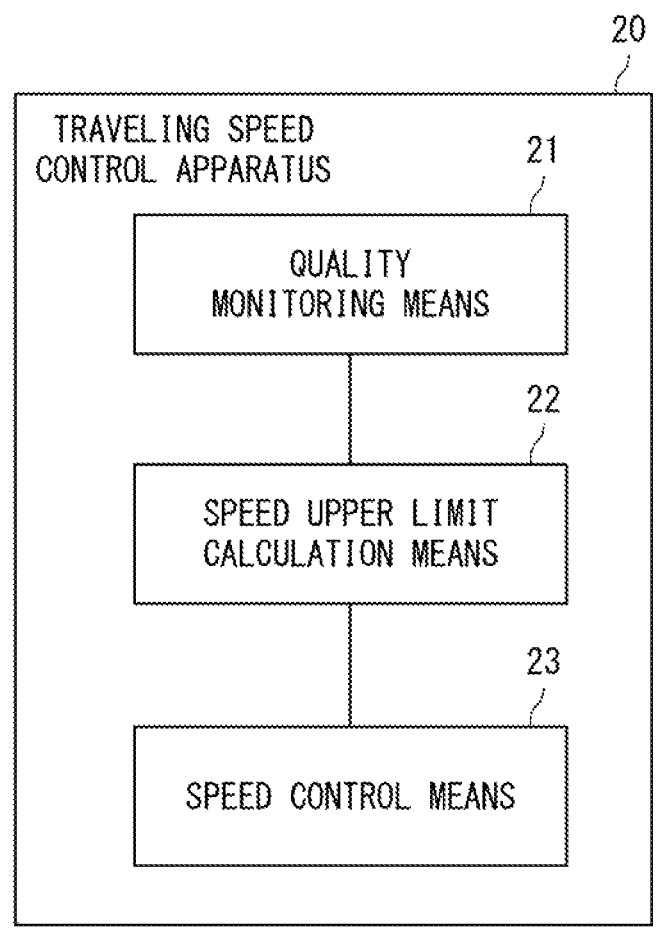
FIG. 2 is a block diagram schematically illustrating a traveling speed control apparatus according to the present disclosure.

FIG. 2 schematically illustrates the traveling speed control apparatus 20. The traveling speed control apparatus 20 includes a quality monitoring means 21, a speed upper limit calculation means 22, and a speed control means 23. The quality monitoring means 21 monitors video quality of video data transmitted from the moving body 40 to the server 30 via the wireless communication network 50. The speed upper limit calculation means 22 calculates, by using the video quality and a monitoring required condition of the video data, a maximum value of a traveling speed that can satisfy the monitoring required condition as an upper limit value of a traveling speed of the moving body 40. The speed control means 23 controls a traveling speed of the moving body 40 to be equal to or lower than the upper limit value calculated by the speed upper limit calculation means 22.

Figure 3:
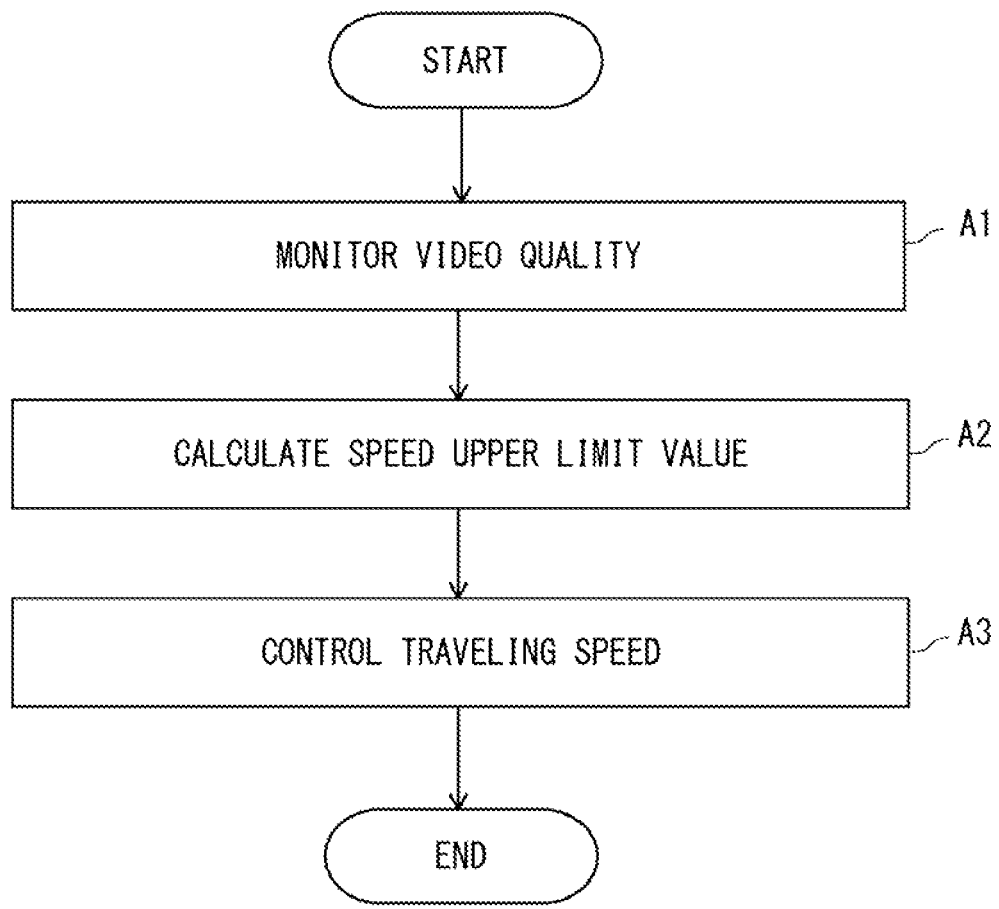
FIG. 3 is a flowchart illustrating an operation procedure of the traveling speed control apparatus.

Subsequently, an operation procedure (traveling speed control method) of the traveling speed control apparatus 20 will be described. FIG. 3 illustrates the operation procedure of the traveling speed control apparatus 20. The quality monitoring means 21 monitors video quality of video data transmitted from the moving body 40 to the server 30 (step A1). The speed upper limit calculation means 22 calculates, by using the video quality monitored in step A1 and a monitoring required condition of the video data in the server 30, a maximum value of a traveling speed that can satisfy the monitoring required condition as an upper limit value of a traveling speed of the moving body 40 (step A2). The speed control means 23 controls a traveling speed of the moving body 40 to be equal to or lower than the upper limit value calculated in step A2 (step A3).

In the present disclosure, the speed upper limit calculation means 22 calculates, by using video quality of video data received by the server 30 and a monitoring required condition of the video data in the server 30, the upper limit value of the traveling speed of the moving body 40 that can satisfy the monitoring required condition. The speed control means 23 controls a traveling speed of the moving body 40 to be equal to or lower than the upper limit value. In the present disclosure, the traveling speed control apparatus 20 can control a traveling speed of the moving body 40 to be equal to or lower than a speed at which the monitoring required condition is satisfied in current video quality. For example, when a traveling speed of the moving body 40 is too fast with respect to video quality of video data received by the server 30, the traveling speed control apparatus 20 can decelerate the traveling speed of the moving body 40 to a speed at which the monitoring required condition is satisfied. As described above, the traveling speed control apparatus 20 can control traveling of the moving body 40 in such a way that remote monitoring of the moving body 40 by using video data can be performed with predetermined accuracy even when video quality is deteriorated.

Figure 4:
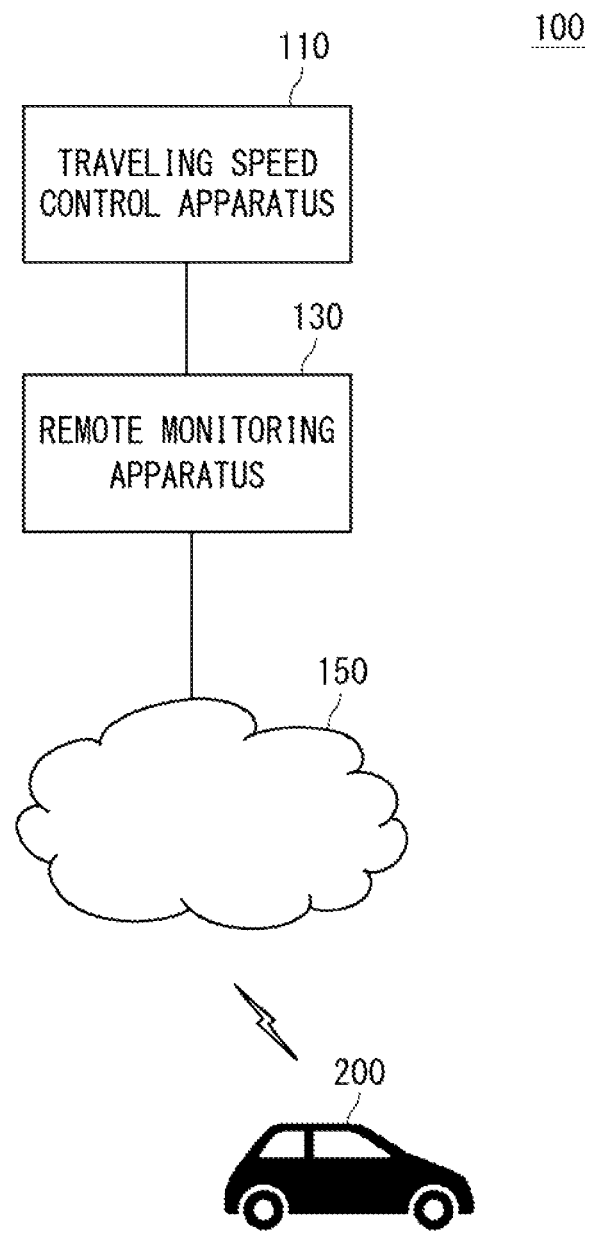
FIG. 4 is a block diagram illustrating a remote monitoring system according to one example embodiment of the present disclosure.

Hereinafter, an example embodiment of the present invention will be described with reference to the drawings. FIG. 4 illustrates a remote monitoring system according to one example embodiment of the present disclosure. A remote monitoring system 100 includes a traveling speed control apparatus 110, a remote monitoring apparatus 130, and a moving body 200. The remote monitoring apparatus 130 is an apparatus for remotely monitoring the moving body 200. The remote monitoring apparatus 130 may be capable of remotely controlling the moving body 200. The traveling speed control apparatus 110 is an apparatus for controlling a traveling speed of the moving body 200. The traveling speed control apparatus 110 corresponds to the traveling speed control apparatus 20 illustrated in FIG. 1. The remote monitoring apparatus 130 corresponds to the server 30 illustrated in FIG. 1.

The remote monitoring apparatus 130 is connected to the moving body 200 via a network 150. The network 150 includes, for example, a wireless communication network using a communication line standard such as long term evolution (LTE). The network 150 may include a wireless communication network such as a WiFi (registered trademark) or a fifth generation mobile communication system. The traveling speed control apparatus 110 controls a traveling speed of the moving body 200 via, for example, the remote monitoring apparatus 130 and the network 150. The network 150 corresponds to the wireless communication network 50 illustrated in FIG. 1.

Note that, although an example in which the traveling speed control apparatus 110 controls a traveling speed of the moving body 200 via the remote monitoring apparatus 130 and the network 150 has been described above, the present disclosure is not limited thereto. The traveling speed control apparatus 110 may be mounted on the moving body 200. In that case, the traveling speed control apparatus 110 may directly communicate with the moving body 200 without passing through the network 150, and control a traveling speed of the moving body 200. In addition, the traveling speed control apparatus 110 and the remote monitoring apparatus 130 are not necessarily configured as individual apparatuses. The traveling speed control apparatus 110 may be configured as a part of the remote monitoring apparatus 130.

The moving body 200 is performed remote monitoring by the remote monitoring apparatus 130. The moving body 200 is configured as a land vehicle such as an automobile, a bus, a taxi, or a truck. In addition, the moving body 200 may be a railroad, a ship, or an airplane, or may be a moving-type robot such as an automated guided vehicle (AGV). Further, the moving body 200 may be configured to be capable of automatic driving (autonomous driving), based on information of a sensor mounted on the moving body. The moving body 200 corresponds to the moving body 40 illustrated in FIG. 1.

Figure 5:
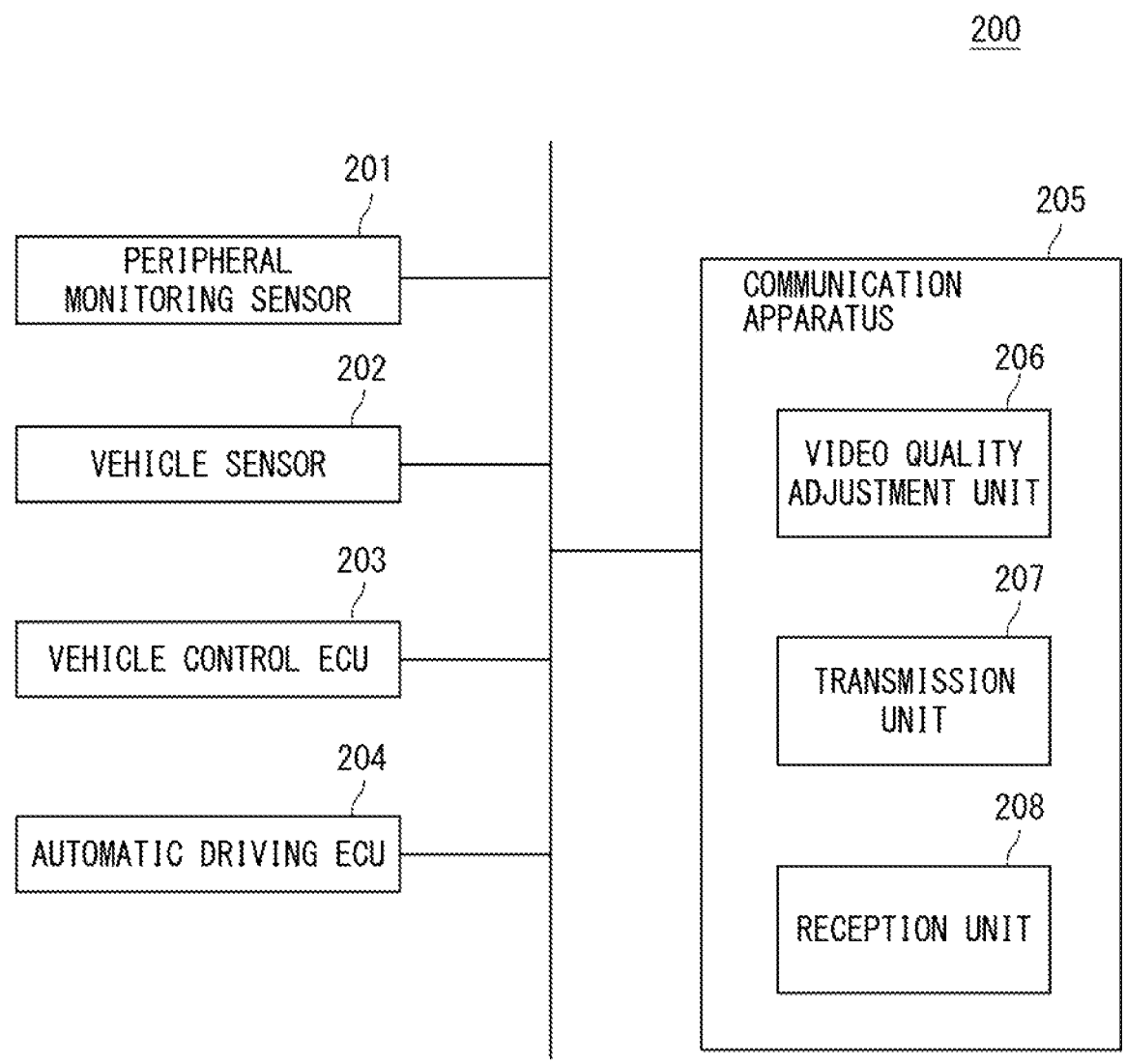
FIG. 5 is a block diagram illustrating a configuration example of a moving body.

FIG. 5 illustrates a configuration example of the moving body 200. The moving body 200 includes a peripheral monitoring sensor 201, a vehicle sensor 202, a vehicle control electric control unit (ECU) 203, an automatic driving ECU 204, and a communication apparatus 205. In the moving body 200, these components are configured to be communicable with one another via an in-vehicle local area network (LAN), controller area network (CAN), and the like.

The peripheral monitoring sensor 201 is a sensor that monitors a peripheral situation of the moving body 200. The peripheral monitoring sensor 201 includes, for example, a camera, a radar, and a light detection and ranging (LiDAR), and the like. The peripheral monitoring sensor 201 may include, for example, a plurality of cameras that capture an image of a front, a back, a right side, and a left side of a vehicle. The peripheral monitoring sensor 201 may include a camera that captures an image of the inside of the moving body 200.

The vehicle sensor 202 is a sensor for detecting various states of the moving body 200. The vehicle sensor 202 includes, for example, a sensor such as a vehicle speed sensor that detects a vehicle speed, a steering sensor that detects a steering angle, an accelerator opening sensor that detects an opening degree of an accelerator pedal, and a brake depression force sensor that detects a depression amount of a brake pedal.

The vehicle control ECU 203 is an electronic control unit that performs travel control and the like of the moving body 200. Generally, an electronic control unit includes a processor, a memory, an input/output (I/O), and a bus connecting therewith. The vehicle control ECU 203 performs various pieces of control such as, for example, control of a fuel injection amount, control of an engine ignition timing, and control of an assist amount of a power steering, based on sensor information being output from the vehicle sensor 202.

The automatic driving ECU 204 is an electronic control unit that controls automatic driving of the moving body 200. The automatic driving ECU 204 acquires sensor information from the peripheral monitoring sensor 201 and the vehicle sensor 202, and controls autonomous traveling of the moving body 200, based on the acquired sensor information.

The communication apparatus 205 is configured as an apparatus that performs wireless communication between the moving body 200 and the network 150 (see FIG. 4). The communication apparatus 205 includes, as a hardware configuration, an antenna for wireless communication, a transmitter, and a receiver. In addition, the communication apparatus 205 includes a processor, a memory, an I/O, and a bus connecting therewith. A function of each unit in the communication apparatus 205 are achieved by, for example, executing a control program stored in a memory by a processor.

The communication apparatus 205 includes a video quality adjustment unit 206, a transmission unit 207, and a reception unit 208. The video quality adjustment unit 206 adjusts quality of a video captured by using a camera included in the peripheral monitoring sensor 201. Herein, adjustment of quality of a video is to adjust a data amount (bit rate) of video data transmitted to the remote monitoring apparatus 130 via the network 150 by adjusting, for example, at least a one of quantization accuracy, resolution, and a frame rate of the video. The video quality adjustment unit 206 monitors a band in the network 150, for example, and adjusts quality of a video according to the band. The video quality adjustment unit 206 may adjust video quality to fixed quality.

The transmission unit 207 transmits various information to the remote monitoring apparatus 130 via the network 150. For example, the transmission unit 207 transmits video data whose video quality has been adjusted by the video quality adjustment unit 206 to the remote monitoring apparatus 130 via the network 150. The transmission unit 207 may acquire sensor information acquired by the vehicle sensor 202, and transmit the acquired sensor information to the remote monitoring apparatus 130 via the network 150. For example, the transmission unit 207 may transmit vehicle speed information acquired by the vehicle sensor 202 to the remote monitoring apparatus 130 via the network 150.

The reception unit 208 receives, for example, information related to control of the moving body 200 from the remote monitoring apparatus 130 via the network 150. The reception unit 208 transmits the received information on the control of the moving body 200 to the vehicle control ECU 203 or the automatic driving ECU 204 via the in-vehicle LAN or the like. In addition, the reception unit 208 receives information indicating an upper limit value of a traveling speed of the moving body 200 from the traveling speed control apparatus 110. The reception unit 208 transmits information indicating the received upper limit value of the traveling speed to the vehicle control ECU 203 or the automatic driving ECU 204 via an in-vehicle LAN or the like. Note that, the reception unit 208 may receive information indicating an upper limit value of the traveling speed from the traveling speed control apparatus 110 via the remote monitoring apparatus 130 and the network 150.

Figure 6:
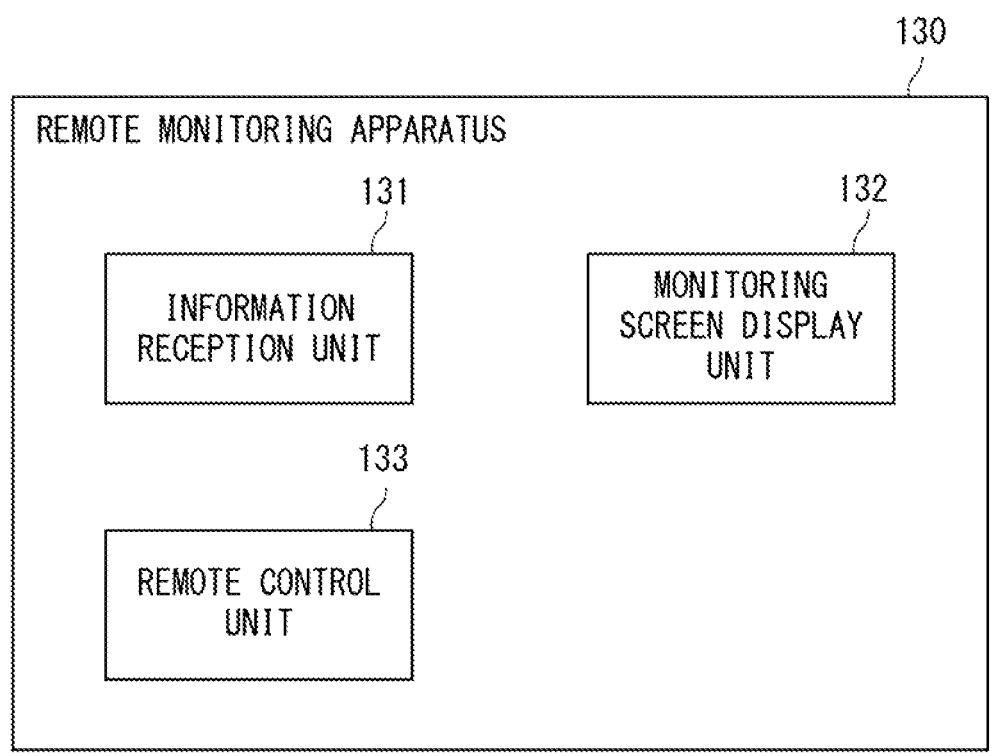
FIG. 6 is a block diagram illustrating a configuration example of a remote monitoring apparatus.

FIG. 6 illustrates a configuration example of the remote monitoring apparatus 130. The remote monitoring apparatus 130 includes an information reception unit 131, a monitoring screen display unit 132, and a remote control unit 133. The information reception unit 131 receives video data transmitted from the transmission unit 207 of the moving body 200 via the network 150 (see FIG. 4). The video data includes a plurality of video frames each associated to a specific time. The information reception unit 131 may receive, from the moving body 200, sensor information acquired by the vehicle sensor 202. The monitoring screen display unit 132 displays the information received by the information reception unit 131 on a display screen. The monitoring screen display unit 132 displays, for example, traveling video data of the moving body 200 and various information such as a vehicle speed, on the display screen. A monitoring person monitors operation of the moving body 200 by viewing the display screen.

The remote control unit 133 transmits information for remotely controlling the moving body 200 to the moving body 200 via the network 150. The remote control unit 133 includes equipment for remotely operating a vehicle, such as a steering wheel, an accelerator pedal, and a brake pedal. A monitoring person (remote driver) performs operation of a steering wheel or the like while viewing a screen displayed by the monitoring screen display unit 132. The remote control unit 133 transmits information (remote control information) indicating an operation amount of the steering wheel and the like to the moving body 200. When receiving remote control information, the reception unit 208 (see FIG. 5) of the moving body 200 transmits the received remote control information to the vehicle control ECU 203 via the in-vehicle LAN or the like. The vehicle control ECU 203 controls the moving body 200, based on the received remote control information. The remote control unit 133 may cause a remote driver to select a remote control command such as a right turn start or an emergency stop. When a remote driver selects a remote control command, the remote control unit 133 may transmit the remote control command to the moving body 200.

Further, the remote control unit 133 may transmit information indicating a parameter of the automatic driving to the moving body 200. When receiving the information indicating the parameter of the automatic driving, the reception unit 208 of the moving body 200 transmits the received information to the automatic driving ECU 204 via the in-vehicle LAN or the like. The automatic driving ECU 204 performs automatic driving of the moving body 200 by using the received parameter and the like.

Figure 7:
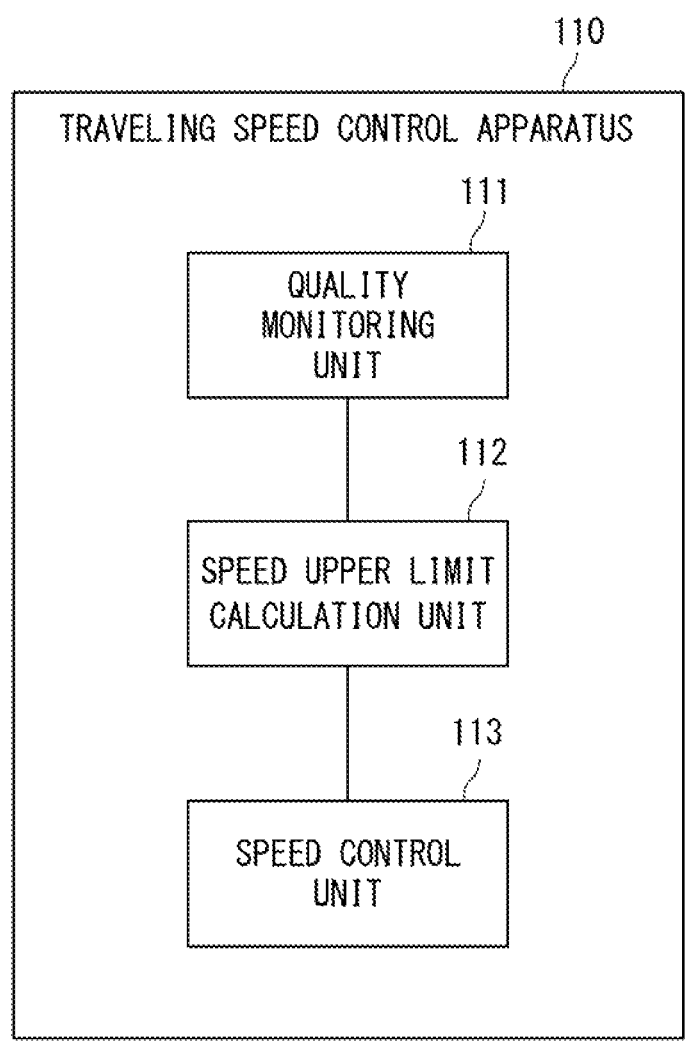
FIG. 7 is a block diagram illustrating a configuration example of the traveling speed control apparatus.

FIG. 7 illustrates a configuration example of the traveling speed control apparatus 110. The traveling speed control apparatus 110 includes a quality monitoring unit 111, a speed upper limit calculation unit 112, and a speed control unit 113. The quality monitoring unit 111 monitors quality (video quality) of video data transmitted from the moving body 200 (see FIG. 4) to the remote monitoring apparatus 130 via the network 150. The quality monitoring unit 111 monitors, for example, at least a one of a frame rate, quantization accuracy, and resolution of video data. Herein, the frame rate indicates the number of video frames of the video data per unit time. For example, the quality monitoring unit 111 monitors video quality of current video data at a predetermined time interval. When the moving body 200 transmits a plurality of pieces of video data to the remote monitoring apparatus 130, the quality monitoring unit 111 monitors, for example, video quality of video data of a camera that captures an image in front of the moving body. The quality monitoring unit 111 may monitor video quality of video data other than the front according to a traveling direction of the moving body 200 and the like. The quality monitoring unit 111 corresponds to the quality monitoring means 21 illustrated in FIG. 2. Note that, video quality of video data may be acquired by analyzing the received video data in the information reception unit 131 of the remote monitoring apparatus 130. In addition, video quality being set in the camera may be acquired from the video quality adjustment unit 206 or the peripheral monitoring sensor 201 of the moving body 200, and video quality of video data may be monitored by using the acquired video quality.

The speed upper limit calculation unit 112 calculates, by using the video quality monitored by the quality monitoring unit 111 and a monitoring required condition of video data, an upper limit value of a traveling speed of the moving body 200. The speed upper limit calculation unit 112 calculates, for example, a maximum value of the traveling speed that can satisfy a given monitoring required condition as an upper limit value of a traveling speed of the moving body 200. The speed upper limit calculation unit 112 corresponds to the speed upper limit calculation means 22 illustrated in FIG. 2.

When the moving body 200 transmits video data for each of a plurality of cameras to the remote monitoring apparatus 130, the speed upper limit calculation unit 112 may determine video data used for calculating the upper limit value of the traveling speed according to a vehicle state or the like. For example, the speed upper limit calculation unit 112 may calculate the upper limit value of the traveling speed, based on video quality of video data of a camera that captures the traveling direction of the moving body 200. For example, the upper limit value of the traveling speed may be calculated, based on video quality of video data of a camera that captures a front of the moving body 200 when the moving body 200 is moving forward, and video quality of video data of a camera that captures a back of the moving body 200 when the moving body 200 is moving backward.

Further, the speed upper limit calculation unit 112 may determine an important camera by considering an operation state (right or left) of a direction indicator, and calculate the upper limit value of the traveling speed, based on video quality of video data of the important camera. For example, when a right direction indicator is operated, the speed upper limit calculation unit 112 may determine whether the moving body 200 turns right or changes a route to the right by using map information, and determine the important camera according to a determination result. In that case, the speed upper limit calculation unit 112 may calculate the upper limit value of the traveling speed, based on video quality of video data of the important camera.

The speed upper limit calculation unit 112 may calculate the upper limit value of the traveling speed for each camera by using a monitoring required condition being set for each camera. For example, the speed upper limit calculation unit 112 calculates a speed upper limit value based on video quality of video data of the front camera, based on the video quality of the video data of the camera that captures the front of the moving body 200 and a monitoring required condition of the front camera. The speed upper limit calculation unit 112 calculates a speed upper limit value based on video quality of video data of a camera on the left side, based on the video quality of the video data of the camera that captures the left side of the moving body 200 and a monitoring required condition of the camera on the left side. The speed upper limit calculation unit 112 calculates a speed upper limit value based on video quality of video data of a camera on the right side, based on the video quality of the video data of the camera on the right side and the monitoring required condition of the camera that captures the right side of the moving body 200 and a monitoring required condition of the camera on the right side. The speed upper limit calculation unit 112 may set, for example, a minimum value among the upper limit values of the traveling speed calculated for each camera as the upper limit value of the traveling speed of the moving body 200.

Hereinafter, examples of calculating an upper limit value of a traveling speed will be described. First, an example in which the speed upper limit calculation unit 112 calculates the upper limit value of the traveling speed, based on a frame rate, will be described. In this example, a monitoring required condition indicates an allowable maximum value (A [m]) of an object recognition error. The object recognition error is defined, for example, as a distance between a position of an object recognized at a certain time by using a video frame received by the remote monitoring apparatus 130 and an actual position of the object at that time. In other words, the object recognition error is defined as a distance between a "position of an object recognized at a time t by using a video frame received by the remote monitoring apparatus 130" and a "position of the object in a real space at the time t". The allowable maximum value of the object recognition error (A [m]) is assumed to be defined in advance.

The object recognition error indicates, for example, a distance at which a moving body moves within a video frame time interval of video data. The video frame time interval is a time interval between video frames being adjacent with each other in time, and may also be expressed as an inverse of the frame rate. The speed upper limit calculation unit 112 calculates, by using the video frame time interval and the allowable maximum value of the object recognition error, a traveling speed satisfying a condition that a distance moved by the moving body 200 within the video frame time interval becomes equal to the allowable maximum value (A [m]) of the object recognition error. The speed upper limit calculation unit 112 sets a traveling speed satisfying such a condition as the upper limit value of the traveling speed of the moving body 200.

As a specific example, it is assumed that a frame rate of video data is B [frame per second (fps)]. In that case, the monitoring screen display unit 132 (see FIG. 6) continues to display an image of each frame for 1/B second, which is the frame time interval. When a traveling speed of the moving body 200 is V [m/s], the moving body 200 is highly likely to move by V/B [m] during 1/B second. A remote monitoring person cannot recognize the movement of V/B[m] in the video displayed by the monitoring screen display unit 132. The V/B[m] is set as the object recognition error.

The speed upper limit calculation unit 112 calculates a maximum value of a traveling speed V satisfying V/B≤A as the upper limit value of the traveling speed. In other words, the speed upper limit calculation unit 112 calculates the upper limit value of the traveling speed by using Vmax=A×B with the upper limit value of the traveling speed being Vmax. For example, it is considered a case where the allowable maximum value of the object recognition error is A=3 [m] and the frame rate of the video data is B=5 [fps]. In this case, when the moving body 200 is traveling at the traveling speed V satisfying V/5≤3, the object recognition error becomes equal to or less than the allowable maximum value 3 [m]. In this case, the upper limit value Vmax of the traveling speed is acquired by Vmax=3×5=15 [m/s].

The object recognition error may indicate a distance that the moving body 200 moves within a display delay time of video data. The display delay time includes a video frame time interval of video data and various delay times. Each delay time includes, for example, at least one of a communication delay time related to packet transmission of video data, a signal processing delay time of video data, or an encoding delay time of video data. In that case, the speed upper limit calculation unit 112 calculates, by using the display delay time and the allowable maximum value of the object recognition error, a traveling speed satisfying a condition that a distance moved by the moving body 200 within the display delay time becomes equal to the allowable maximum value of the object recognition error. The speed upper limit calculation unit 112 may set the traveling speed satisfying such a condition as the upper limit value of the traveling speed of the moving body 200. In the above-described specific example, it is assumed that the signal processing delay time and the communication delay time are expected to be 100 ms in total. In that case, a remote monitoring person cannot recognize movement of V×(1/B+ 0.1 [s]) in the video displayed by the monitoring screen display unit 132. In that case, the upper limit value Vmax of the traveling speed is acquired by Vmax=A/(1/B+0.1)=3/ (⅕+0.1)=10 [m/s].

Subsequently, an example in which the speed upper limit calculation unit 112 calculates an upper limit value of a traveling speed, based on resolution and quantization accuracy of video data will be described. In this example, an allowable minimum value (C [s]) of an object recognition duration time is set as a monitoring required condition. Note that, the object recognition duration time herein is defined as a time when a predetermined target object in video data can be recognized successively (continuously) in time. A time when a predetermined target object in the video data can be continuously recognized varies depending on the resolution and the quantization accuracy. The allowable minimum value (C [s]) of the object recognition duration time is assumed to be defined in advance.

The speed upper limit calculation unit 112 calculates the upper limit value of the traveling speed of the moving body 200, by using a recognizable maximum distance of a predetermined target object determined according to the resolution and the quantization accuracy, and the allowable minimum value (C [s]) of the object recognition duration time. For example, the speed upper limit calculation unit 112 calculates a traveling speed satisfying a condition that a time required for the moving body 200 to move a recognizable maximum distance (D [m]) becomes equal to the allowable minimum value (C [s]) of the object recognition duration time. The speed upper limit calculation unit 112 sets the traveling speed satisfying such a condition as the upper limit value of the traveling speed of the moving body 200.

The recognizable maximum distance (D [m]) described above indicates an extent of a distance between the predetermined target object, for example, a character of a road sign, and the moving body 200, the distance in which a person who views video data can recognize the predetermined target object. Prior to operation, it is assumed that the recognizable maximum distance (D [m]) is experimentally acquired for each piece of resolution and quantization accuracy. When a traveling speed of the moving body 200 is V [m/s], a remote monitoring person can continuously recognize a character of the road sign by D/V [s] by using the video data received by the remote monitoring apparatus 130. This time corresponds to the object recognition duration time described above. A condition for a remote monitoring person to continuously recognize a character of the road sign by at least C [s] can be expressed as D/V≥C. Therefore, the speed upper limit calculation unit 112 can calculate the upper limit value Vmax of the traveling speed by Vmax=D/C.

For example, it is assumed that, in video data having certain resolution, relationships that the recognizable maximum distance D of a character of a road sign is 50 m when the quantization accuracy (quantization parameter (QP)) is 15, 40 m when the QP is 17, 30 m when the QP is 19, and 20 m when the QP is 21 are experimentally acquired. In addition, it is assumed that the allowable minimum value of the object recognition duration time is C=5 [s]. In this case, when video data with QP=17 is transmitted from the moving body 200 to the remote monitoring apparatus 130, the upper limit value Vmax of the traveling speed is acquired by Vmax=D/C=40/5=8 [m/s].

The speed control unit 113 controls a traveling speed of the moving body 200 to be equal to or lower than the upper limit value of the traveling speed. The speed control unit 113 controls a traveling speed of the moving body 200 to be equal to or lower than the upper limit value of the traveling speed by transmitting information indicating the upper limit value of the traveling speed to the moving body 200 via the network 150, for example. Note that, the speed control unit 113 may compare vehicle speed information acquired from the moving body 200 with the upper limit value of the traveling speed, and transmit information indicating the upper limit value of the traveling speed to the moving body 200 only when the vehicle speed of the moving body 200 exceeds the upper limit value of the traveling speed. The speed control unit 113 corresponds to the speed control means 23 illustrated in FIG. 2.

In the moving body 200, for example, when the moving body 200 is in automatic driving, the reception unit 208 transmits information indicating the received upper limit value of the traveling speed to the automatic driving ECU 204 via the in-vehicle LAN or the like. The automatic driving ECU 204 performs automatic driving of the moving body 200 at a speed equal to or lower than the upper limit value of the traveling speed. In addition, when the moving body 200 is not in automatic driving, the reception unit 208 transmits information indicating the upper limit value of the traveling speed to the vehicle control ECU 203 via the in-vehicle LAN or the like. The vehicle control ECU 203 controls the moving body 200 in such a way that a traveling speed of the moving body 200 becomes equal to or lower than the upper limit value of the traveling speed. For example, when a current speed exceeds the upper limit value, the vehicle control ECU 203 decelerates the traveling speed to the upper limit value by operating a brake. Alternatively, the vehicle control ECU may disable an accelerator operation, and decelerate the traveling speed to the upper limit value. The vehicle control ECU 203 may display the upper limit value of the traveling speed in a meter, for example, and prompt a driver to decelerate.

Note that, when the moving body 200 is performed remote control by the remote monitoring apparatus 130, the speed control unit 113 may transmit information indicating the upper limit value of the traveling speed to the remote monitoring apparatus 130. In that case, the remote control unit 133 (see FIG. 6) of the remote monitoring apparatus 130 may perform remote control the moving body 200 in such a way that a traveling speed becomes equal to or lower than the upper limit value.

Figure 8:
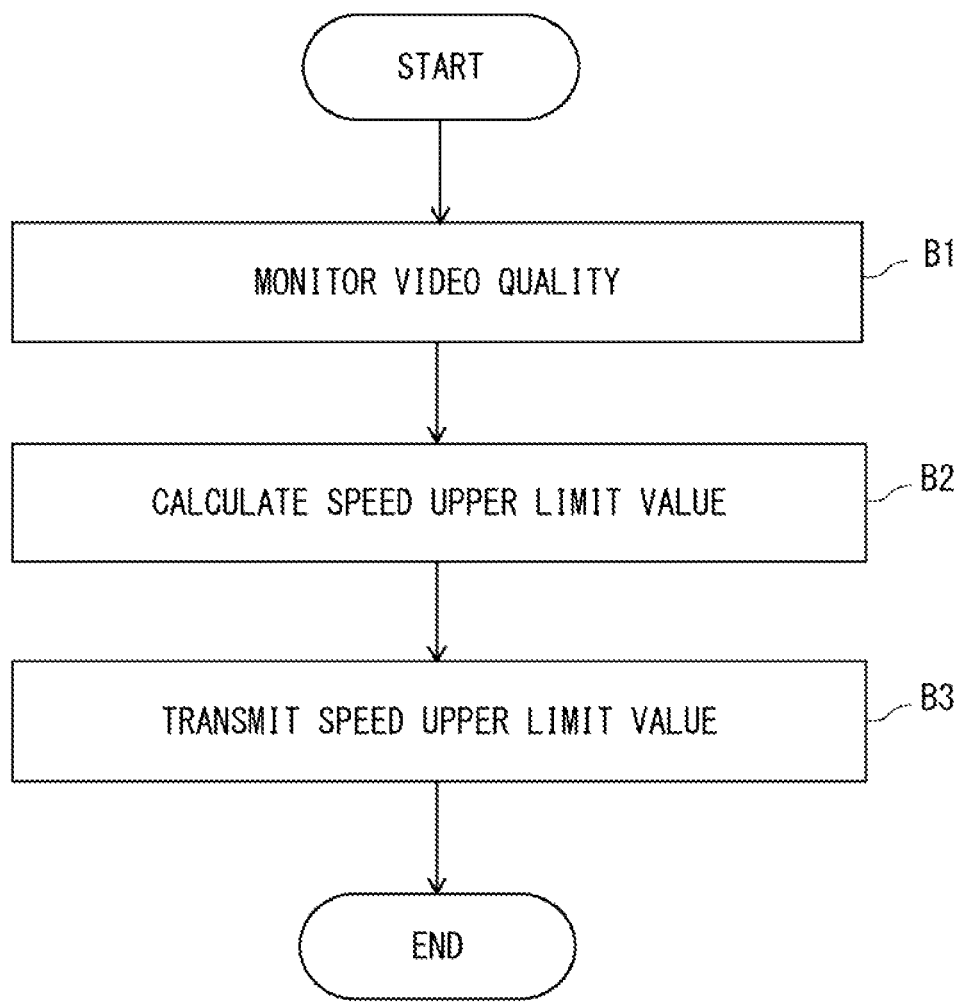
FIG. 8 is a flowchart illustrating an operation procedure in the traveling speed control apparatus.

Subsequently, an operation procedure will be described. FIG. 8 illustrates the operation procedure (traveling speed control method) in the traveling speed control apparatus 110. The quality monitoring unit 111 monitors video quality of video data transmitted from the moving body 200 to the remote monitoring apparatus 130 (step B1). In step B1, the quality monitoring unit 111 acquires, for example, current video quality. For example, the quality monitoring unit 111 acquires video quality of video data from the remote monitoring apparatus 130. The quality monitoring unit 111 may acquire video quality of video data from the moving body 200.

The speed upper limit calculation unit 112 calculates an upper limit value of a traveling speed of the moving body 200, based on the video quality acquired by the quality monitoring unit 111 and a monitoring required condition (step B2). In step B2, the speed upper limit calculation unit 112 calculates the upper limit value of the traveling speed, based on a frame rate of the video data and a monitoring required condition (the allowable maximum value of the object recognition error). Alternatively, the speed upper limit calculation unit 112 calculates the upper limit value of the traveling speed, based on quantization accuracy and resolution of the video data and a monitoring required condition (the allowable minimum value of the object recognition duration time).

In step B2, the speed upper limit calculation unit 112 may calculate the upper limit value of the traveling speed by using the frame rate, and calculate the upper limit value of the traveling speed by using the quantization accuracy and the resolution. The speed upper limit calculation unit 112 may determine, as the upper limit value of the traveling speed of the moving body 200, a lower speed among the upper limit value of the traveling speed calculated by using the frame rate and the upper limit value of the traveling speed calculated by using the quantization accuracy and the resolution.

The speed control unit 113 transmits information indicating the upper limit value of the traveling speed to the moving body 200 (step B3). The reception unit 208 of the moving body 200 receives information indicating the upper limit value of the traveling speed. The reception unit 208 transmits information indicating the upper limit value of the traveling speed to the vehicle control ECU 203 or the automatic driving ECU 204. The vehicle control ECU 203 or the automatic driving ECU 204 controls a traveling speed of the moving body 200 to be equal to or lower than the upper limit value of the traveling speed. When a traveling speed is controlled to be equal to or lower than the upper limit value of the traveling speed, the vehicle control ECU 203 or the automatic driving ECU 204 may display the upper limit value of the traveling speed in the moving body, and notify a driver or the like that speed is regulated.

Figure 9:
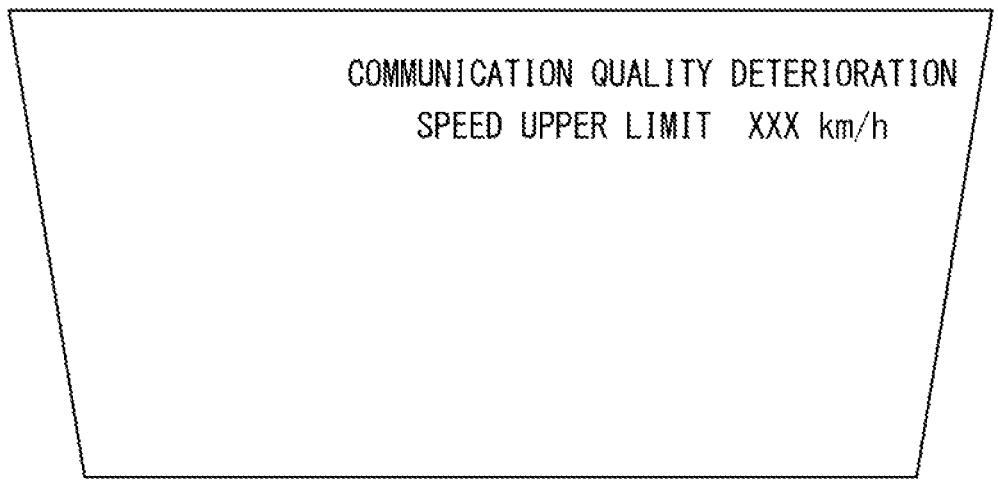
FIG. 9 is a diagram illustrating an example of a notification that speed is regulated.

FIG. 9 illustrates an example of a notification that speed is regulated. When receiving information indicating the upper limit value of the traveling speed, the vehicle control ECU 203 displays "communication quality deterioration" on, for example, a windshield (windscreen) of the moving body, and displays the upper limit value of the traveling speed. The vehicle control ECU 203 may display the upper limit value of the traveling speed or the like on the windshield by using, for example, a projection device. By viewing such a display, a driver can know that the speed of the moving body 200 is regulated. Alternatively, a driver can reduce a traveling speed of the moving body 200 to the upper limit value of the traveling speed by viewing such a display.

Figure 10:
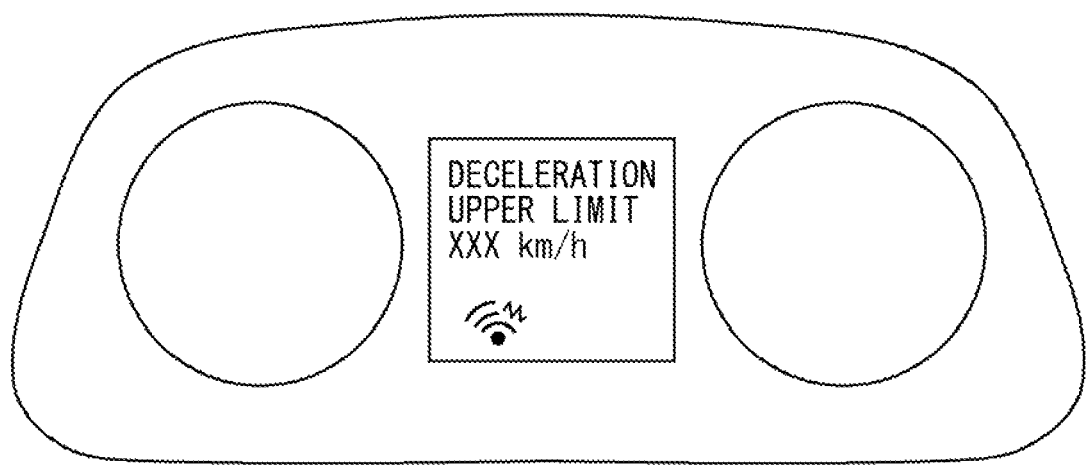
FIG. 10 is a diagram illustrating another example of a notification that speed is regulated.

FIG. 10 illustrates another example of a notification that speed is regulated. When receiving the information indicating the upper limit value of the traveling speed, the vehicle control ECU 203 may display a message that deceleration is prompted and the upper limit value of the traveling speed on, for example, a multi-information display in a meter cluster or the like. By viewing such a display, a driver can know that it is necessary to decelerate a traveling speed of the moving body 200 to the upper limit value of the traveling speed.

In the present example embodiment, the speed upper limit calculation unit 112 calculates an upper limit value of a traveling speed of the moving body 200 according to video quality and a monitoring required condition. For example, when a traveling speed of the moving body 200 is fast and a predetermined monitoring required condition cannot be satisfied in the remote monitoring apparatus 130 at that speed, the speed upper limit calculation unit 112 calculates a speed lower than a current traveling speed as the upper limit value of the traveling speed. The speed control unit 113 controls a traveling speed of the moving body 200 to be equal to or lower than the upper limit value of the traveling speed. In the present example embodiment, the upper limit value of the traveling speed is calculated according to the video quality and the monitoring required condition. Therefore, after the speed control unit 113 controls a traveling speed, the remote monitoring apparatus 130 can satisfy the monitoring required condition. As described above, in the present example embodiment, the traveling speed control apparatus 110 can control traveling of the moving body 200 in such a way that the remote monitoring of the moving body by using video data can be performed with predetermined accuracy even when video quality is deteriorated.

Figure 11:
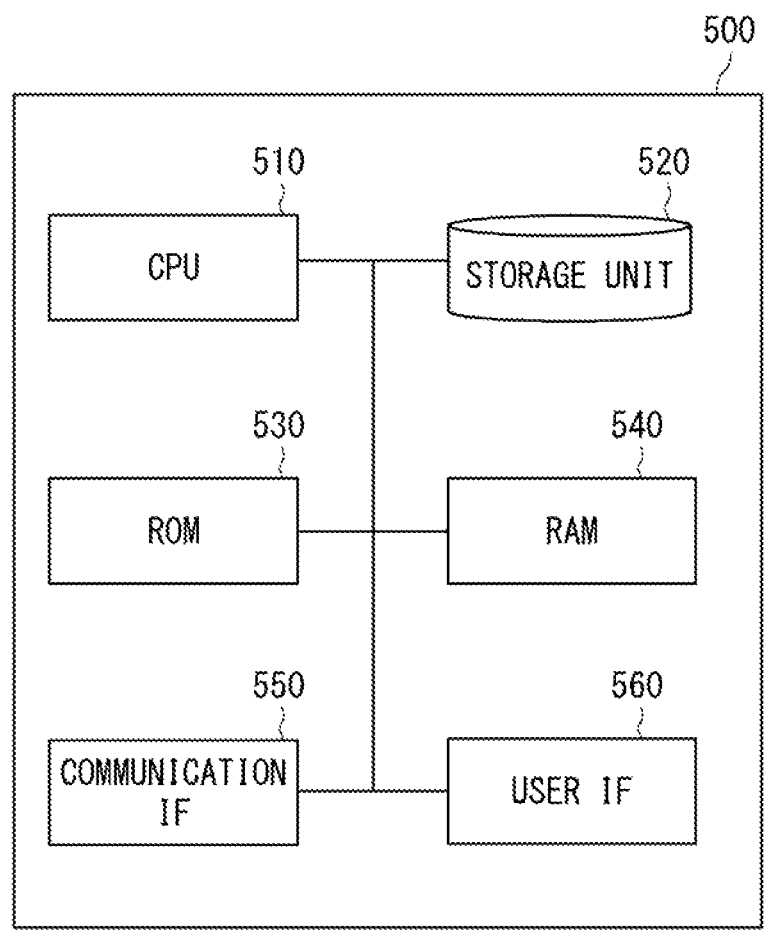
FIG. 11 is a block diagram illustrating a configuration example of a computer apparatus.

In the present disclosure, the traveling speed control apparatus 110 and the remote monitoring apparatus 130 may be configured by using a computer apparatus. FIG. 11 illustrates a configuration example of a computer apparatus that may be used for the traveling speed control apparatus 110 and the remote monitoring apparatus 130. A computer apparatus 500 includes a control unit (central processing unit (CPU)) 510, a storage unit 520, a read only memory (ROM) 530, a random access memory (RAM) 540, a communication interface (IF) 550, and a user interface 560.

The communication interface 550 is an interface for connecting the computer apparatus 500 and a communication network via a wired communication means, a wireless communication means, or the like. The user interface 560 includes a display unit such as a display. In addition, the user interface 560 includes an input unit such as a keyboard, a mouse, and a touch panel.

The storage unit 520 is an auxiliary storage device being capable of holding various pieces of data. The storage unit 520 needs not necessarily be a part of the computer apparatus 500, and may be an external storage device or a cloud storage connected to the computer apparatus 500 via a network.

The ROM 530 is a non-volatile storage device. For example, a semiconductor memory device such as a flash memory having a relatively small capacity is used for the ROM 530. A program executed by the CPU 510 may be stored in the storage unit 520 or the ROM 530. The storage unit 520 or the ROM 530 stores various programs for achieving a function of each unit in the traveling speed control apparatus 110 or the remote monitoring apparatus 130, for example.

The program described above can be stored by using various types of non-transitory computer readable media, and supplied to the computer apparatus 500. The non-transitory computer readable medium includes various types of tangible storage media. Examples of the non-transitory computer readable medium include a magnetic recording medium such as, for example, a flexible disk, a magnetic tape, or a hard disk, a magneto-optical recording medium such as, for example, a magneto-optical disk, an optical disk medium such as a compact disc (CD) or a digital versatile disk (DVD), and a semiconductor memory such as a mask ROM, a programmable ROM (PROM), an erasable PROM (EPROM), a flash ROM, or a RAM. In addition, the program may also be supplied to a computer by using various types of transitory computer readable media. Examples of the transitory computer readable medium include an electric signal, an optical signal, and an electromagnetic wave. The transitory computer readable medium can supply the program to the computer via a wired communication path such as an electric wire and an optical fiber, or a wireless communication path.

The RAM 540 is a volatile storage device. Various semiconductor memory devices such as a dynamic random access memory (DRAM) or a static random access memory (SRAM) are used for the RAM 540. The RAM 540 may be used as an internal buffer for temporarily storing data and the like. The CPU 510 extracts a program stored in the storage unit 520 or the ROM 530 into the RAM 540, and executes the program. By executing the program by the CPU 510, the function of each unit in the traveling speed control apparatus 110 or the remote monitoring apparatus 130 may be achieved. The CPU 510 may include an internal buffer capable of temporarily storing data and the like.

While the example embodiment of the present disclosure has been described in detail above, the present disclosure is not limited to the above-described example embodiment, and change and modification to the above-described example embodiment without departing from the spirit of the present disclosure are also included in the present disclosure.

For example, some or all of the above-described example embodiment may be described as supplementary notes below, but are not limited thereto.

[Supplementary Note 1]

A traveling speed control apparatus comprising:

quality monitoring means for monitoring video quality of video data to be transmitted from a moving body to a server via a wireless communication network;

speed upper limit calculation means for calculating, by using the video quality and a monitoring required condition of the video data, a maximum value of a traveling speed that can satisfy the monitoring required condition as an upper limit value of a traveling speed of the moving body; and speed control means for controlling a traveling speed of the moving body to be equal to or lower than the upper limit value.

[Supplementary Note 2]

The traveling speed control apparatus according to Supplementary Note 1, wherein the video data include a plurality of video frames each associated to a specific time, the video quality includes a frame rate indicating the number of video frames of the video data per unit time, the monitoring required condition indicates an allowable maximum value of an object recognition error, and the object recognition error is defined as a distance between a position of an object being recognized by using a video frame received by the server and an actual position of the object.

[Supplementary Note 3]

The traveling speed control apparatus according to Supplementary Note 2, wherein the object recognition error indicates a distance at which the moving body moves within a video frame time interval of the video data, and the speed upper limit calculation means calculates, by using the video frame time interval and the allowable maximum value, a traveling speed satisfying a condition that a distance at which the moving body moves within the video frame time interval becomes equal to the allowable maximum value, and sets the calculated traveling speed as an upper limit value of the traveling speed.

[Supplementary Note 4]

The traveling speed control apparatus according to Supplementary Note 2, wherein the object recognition error indicates a distance at which the moving body moves within a display delay time of the video data, the speed upper limit calculation means calculates, by using the display delay time and the allowable maximum value, a traveling speed satisfying a condition that a distance at which the moving body moves within the display delay time becomes equal to the allowable maximum value, and sets the calculated traveling speed as an upper limit value of the traveling speed, and the display delay time includes at least one of a communication delay time related to packet transmission of the video data, a signal processing delay time of the video data, or an encoding delay time of the video data, and a video frame time interval of the video data.

[Supplementary Note 5]

The traveling speed control apparatus according to Supplementary Note 1, wherein the video quality includes resolution and quantization accuracy of the video data, the monitoring required condition indicates an allowable minimum value of an object recognition duration time, and the object recognition duration time is defined as a time when a predetermined target object in the video data can be continuously recognized in time.

[Supplementary Note 6]

The traveling speed control apparatus according to Supplementary Note 5, wherein the speed upper limit calculation means calculates, by using a recognizable maximum distance of a predetermined target object to be determined according to the resolution and the quantization accuracy, and the allowable minimum value, a traveling speed satisfying a condition that a time required for the moving body to move at the recognizable maximum distance becomes equal to the allowable minimum value, and sets the calculated traveling speed as an upper limit value of the traveling speed.

[Supplementary Note 7]

A remote monitoring system comprising:

a server configured to receive video data from a moving body via a wireless communication network; and a traveling speed control apparatus configured to control a traveling speed of the moving body, wherein the traveling speed control apparatus includes:

quality monitoring means for monitoring video quality of video data to be received by the server;

speed upper limit calculation means for calculating, by using the video quality and a monitoring required condition of the video data, a maximum value of a traveling speed that can satisfy the monitoring required condition as an upper limit value of a traveling speed of the moving body; and speed control means for controlling a traveling speed of the moving body to be equal to or lower than the upper limit value.

[Supplementary Note 8]

The remote monitoring system according to Supplementary Note 7, wherein the video data include a plurality of video frames each associated to a specific time, the video quality includes a frame rate indicating the number of video frames of the video data per unit time, the monitoring required condition indicates an allowable maximum value of an object recognition error, and the object recognition error is defined as a distance between a position of an object being recognized by using a video frame received by the server and an actual position of the object.

[Supplementary Note 9]

The remote monitoring system according to Supplementary Note 8, wherein the object recognition error indicates a distance at which the moving body moves within a video frame time interval of the video data, and the speed upper limit calculation means calculates, by using the video frame time interval and the allowable maximum value, a traveling speed satisfying a condition that a distance at which the moving body moves within the video frame time interval becomes equal to the allowable maximum value, and sets the calculated traveling speed as an upper limit value of the traveling speed.

[Supplementary Note 10]

The remote monitoring system according to Supplementary Note 8, wherein the object recognition error indicates a distance at which the moving body moves within a display delay time of the video data, the speed upper limit calculation means calculates, by using the display delay time and the allowable maximum value, a traveling speed satisfying a condition that a distance at which the moving body moves within the display delay time becomes equal to the allowable maximum value, and sets the calculated traveling speed as an upper limit value of the traveling speed, and the display delay time includes at least one of a communication delay time related to packet transmission of the video data, a signal processing delay time of the video data, or an encoding delay time of the video data, and a video frame time interval of the video data.

[Supplementary Note 11]

The remote monitoring system according to Supplementary Note 7, wherein the video quality includes resolution and quantization accuracy of the video data, the monitoring required condition indicates an allowable minimum value of an object recognition duration time, and the object recognition duration time is defined as a time when a predetermined target object in the video data can be continuously recognized in time.

[Supplementary Note 12]

The remote monitoring system according to Supplementary Note 11, wherein the speed upper limit calculation means calculates, by using a recognizable maximum distance of a predetermined target object to be determined according to the resolution and the quantization accuracy, and the allowable minimum value, a traveling speed satisfying a condition that a time required for the moving body to move at the recognizable maximum distance becomes equal to the allowable minimum value, and sets the calculated traveling speed as an upper limit value of the traveling speed.

[Supplementary Note 13]

A traveling speed control method comprising:

monitoring video quality of video data to be transmitted from a moving body to a server via a wireless communication network;

calculating, by using the video quality and a monitoring required condition of the video data, a maximum value of a traveling speed that can satisfy the monitoring required condition as an upper limit value of a traveling speed of the moving body; and controlling a traveling speed of the moving body to be equal to or lower than the upper limit value.

[Supplementary Note 14]

The traveling speed control method according to Supplementary Note 13, wherein the video data include a plurality of video frames each associated to a specific time, the video quality includes a frame rate indicating the number of video frames of the video data per unit time, the monitoring required condition indicates an allowable maximum value of an object recognition error, and the object recognition error is defined as a distance between a position of an object being recognized by using a video frame received by the server and an actual position of the object.

[Supplementary Note 15]

The traveling speed control method according to Supplementary Note 14, wherein the object recognition error indicates a distance at which the moving body moves within a video frame time interval of the video data, and, in calculation of the upper limit value, by using the video frame time interval and the allowable maximum value, a traveling speed satisfying a condition that a distance at which the moving body moves within the video frame time interval becomes equal to the allowable maximum value is calculated, and the calculated traveling speed is set as an upper limit value of the traveling speed.

[Supplementary Note 16]

The traveling speed control method according to Supplementary Note 14, wherein the object recognition error indicates a distance at which the moving body moves within a display delay time of the video data, in calculation of the upper limit value, by using the display delay time and the allowable maximum value, a traveling speed satisfying a condition that a distance at which the moving body moves within the display delay time becomes equal to the allowable maximum value is calculated, and the calculated traveling speed is set as an upper limit value of the traveling speed, and the display delay time includes at least one of a communication delay time related to packet transmission of the video data, a signal processing delay time of the video data, or an encoding delay time of the video data, and a video frame time interval of the video data.

[Supplementary Note 17]

The traveling speed control method according to Supplementary Note 13, wherein the video quality includes resolution and quantization accuracy of the video data, the monitoring required condition indicates an allowable minimum value of an object recognition duration time, and the object recognition duration time is defined as a time when a predetermined target object in the video data can be continuously recognized in time.

[Supplementary Note 18]

The traveling speed control method according to Supplementary Note 17, wherein, in calculation of the upper limit value, by using a recognizable maximum distance of a predetermined target object to be determined according to the resolution and the quantization accuracy, and the allowable minimum value, a traveling speed satisfying a condition that a time required for the moving body to move at the recognizable maximum distance becomes equal to the allowable minimum value is calculated, and the calculated traveling speed is set as an upper limit value of the traveling speed.

[Supplementary Note 19]

A non-transitory computer readable medium storing a program for causing a computer to execute processing of:

monitoring video quality of video data to be transmitted from a moving body to a server via a wireless communication network;

calculating, by using the video quality and a monitoring required condition of the video data, a maximum value of a traveling speed that can satisfy the monitoring required condition as an upper limit value of a traveling speed of the moving body; and controlling a traveling speed of the moving body to be equal to or lower than the upper limit value.

REFERENCE SIGNS LIST

10: REMOTE MONITORING SYSTEM
20: TRAVELING SPEED CONTROL APPARATUS
21: QUALITY MONITORING MEANS
22: SPEED UPPER LIMIT CALCULATION MEANS
23: SPEED CONTROL MEANS
30: SERVER
40: MOVING BODY
50: WIRELESS COMMUNICATION NETWORK
100: REMOTE MONITORING SYSTEM
110: TRAVELING SPEED CONTROL APPARATUS
111: QUALITY MONITORING UNIT
112: SPEED UPPER LIMIT CALCULATION UNIT
113: SPEED CONTROL UNIT
130: REMOTE MONITORING APPARATUS
131: INFORMATION RECEPTION UNIT
132: MONITORING SCREEN DISPLAY UNIT
133: REMOTE CONTROL UNIT
200: MOVING BODY
201: PERIPHERAL MONITORING SENSOR
202: VEHICLE SENSOR
203: VEHICLE CONTROL ECU
204: AUTOMATIC DRIVING ECU
205: COMMUNICATION APPARATUS
206: VIDEO QUALITY ADJUSTMENT UNIT
207: TRANSMISSION UNIT
208: RECEPTION UNIT
500: COMPUTER APPARATUS

510: CPU
520: STORAGE UNIT
530: ROM
540: RAM
550: COMMUNICATION INTERFACE
560: USER INTERFACE

What is claimed is:

1. A traveling speed control apparatus comprising:
at least one memory storing instructions, and
at least one processor configured to execute the instructions to:
monitor video quality of video data to be transmitted from a moving body to a server via a wireless communication network;
calculate, by using the video quality and a monitoring required condition of the video data, a maximum value of a traveling speed that can satisfy the monitoring required condition as an upper limit value of a traveling speed of the moving body; and
control a traveling speed of the moving body to be equal to or lower than the upper limit value, and
wherein the video quality of video data comprises at least one of quantization accuracy, resolution, and a frame rate of the video data, and the monitoring required condition is related to recognition of an object based on the video data.

2. The traveling speed control apparatus according to claim 1, wherein
the video data include a plurality of video frames each associated to a specific time,
the video quality includes a frame rate indicating a number of video frames of the video data per unit time,
the monitoring required condition indicates an allowable maximum value of an object recognition error, and
the object recognition error is defined as a distance between a position of an object being recognized by using a video frame received by the server and an actual position of the object.

3. The traveling speed control apparatus according to claim 2, wherein
the object recognition error indicates a distance at which the moving body moves within a video frame time interval of the video data, and
the at least one processor is configured to execute the instructions to calculate, by using the video frame time interval and the allowable maximum value, a traveling speed satisfying a condition that a distance at which the moving body moves within the video frame time interval becomes equal to the allowable maximum value, and set the calculated traveling speed as an upper limit value of the traveling speed.

4. The traveling speed control apparatus according to claim 2, wherein
the object recognition error indicates a distance at which the moving body moves within a display delay time of the video data,
the at least one processor is configured to execute the instructions to calculate, by using the display delay time and the allowable maximum value, a traveling speed satisfying a condition that a distance at which the moving body moves within the display delay time becomes equal to the allowable maximum value, and set the calculated traveling speed as an upper limit value of the traveling speed, and
the display delay time includes at least one of a communication delay time related to packet transmission of the video data, a signal processing delay time of the video data, or an encoding delay time of the video data, and a video frame time interval of the video data.

5. The traveling speed control apparatus according to claim 1, wherein
the video quality includes resolution and quantization accuracy of the video data,
the monitoring required condition indicates an allowable minimum value of an object recognition duration time, and
the object recognition duration time is defined as a time when a predetermined target object in the video data can be continuously recognized in time.

6. The traveling speed control apparatus according to claim 5, wherein the at least one processor is configured to execute the instructions to calculate, by using a recognizable maximum distance of a predetermined target object to be determined according to the resolution and the quantization accuracy, and the allowable minimum value, a traveling speed satisfying a condition that a time required for the moving body to move at the recognizable maximum distance becomes equal to the allowable minimum value, and set the calculated traveling speed as an upper limit value of the traveling speed.

7. A remote monitoring system comprising:
a server configured to receive video data from a moving body via a wireless communication network; and
a traveling speed control apparatus configured to control a traveling speed of the moving body,
wherein the traveling speed control apparatus includes:
at least one memory storing instructions, and
at least one processor configured to execute the instructions to:
monitor video quality of video data to be received by the server;
calculate, by using the video quality and a monitoring required condition of the video data, a maximum value of a traveling speed that can satisfy the monitoring required condition as an upper limit value of a traveling speed of the moving body; and
control a traveling speed of the moving body to be equal to or lower than the upper limit value, and
wherein the video quality of video data comprises at least one of quantization accuracy, resolution, and a frame rate of the video data, and the monitoring required condition is related to recognition of an object based on the video data.

8. The remote monitoring system according to claim 7, wherein
the video data include a plurality of video frames each associated to a specific time,
the video quality includes a frame rate indicating a number of video frames of the video data per unit time,
the monitoring required condition indicates an allowable maximum value of an object recognition error, and
the object recognition error is defined as a distance between a position of an object being recognized by using a video frame received by the server and an actual position of the object.

9. The remote monitoring system according to claim 8, wherein
the object recognition error indicates a distance at which the moving body moves within a video frame time interval of the video data, and
the at least one processor is configured to execute the instructions to calculate, by using the video frame time interval and the allowable maximum value, a traveling speed satisfying a condition that a distance at which the moving body moves within the video frame time interval becomes equal to the allowable maximum value, and set the calculated traveling speed as an upper limit value of the traveling speed.

10. The remote monitoring system according to claim 8, wherein
the object recognition error indicates a distance at which the moving body moves within a display delay time of the video data,
the at least one processor is configured to execute the instructions to calculate, by using the display delay time and the allowable maximum value, a traveling speed satisfying a condition that a distance at which the moving body moves within the display delay time becomes equal to the allowable maximum value, and set the calculated traveling speed as an upper limit value of the traveling speed, and
the display delay time includes at least one of a communication delay time related to packet transmission of the video data, a signal processing delay time of the video data, or an encoding delay time of the video data, and a video frame time interval of the video data.

11. The remote monitoring system according to claim 7, wherein
the video quality includes resolution and quantization accuracy of the video data,
the monitoring required condition indicates an allowable minimum value of an object recognition duration time, and
the object recognition duration time is defined as a time when a predetermined target object in the video data can be continuously recognized in time.

12. The remote monitoring system according to claim 11, wherein the at least one processor is configured to execute the instructions to calculate, by using a recognizable maximum distance of a predetermined target object to be determined according to the resolution and the quantization accuracy, and the allowable minimum value, a traveling speed satisfying a condition that a time required for the moving body to move at the recognizable maximum distance becomes equal to the allowable minimum value, and set the calculated traveling speed as an upper limit value of the traveling speed.

13. A traveling speed control method performed by a computer and comprising:
monitoring video quality of video data to be transmitted from a moving body to a server via a wireless communication network;
calculating, by using the video quality and a monitoring required condition of the video data, a maximum value of a traveling speed that can satisfy the monitoring required condition as an upper limit value of a traveling speed of the moving body; and
controlling a traveling speed of the moving body to be equal to or lower than the upper limit value, and
wherein the video quality of video data comprises at least one of quantization accuracy, resolution, and a frame rate of the video data, and the monitoring required condition is related to recognition of an object based on the video data.

14. The traveling speed control method according to claim 13, wherein
the video data include a plurality of video frames each associated to a specific time,
the video quality includes a frame rate indicating a number of video frames of the video data per unit time,
the monitoring required condition indicates an allowable maximum value of an object recognition error, and
the object recognition error is defined as a distance between a position of an object being recognized by using a video frame received by the server and an actual position of the object.

15. The traveling speed control method according to claim 14, wherein
the object recognition error indicates a distance at which the moving body moves within a video frame time interval of the video data, and,
in calculation of the upper limit value, by using the video frame time interval and the allowable maximum value, a traveling speed satisfying a condition that a distance at which the moving body moves within the video frame time interval becomes equal to the allowable maximum value is calculated, and the calculated traveling speed is set as an upper limit value of the traveling speed.

16. The traveling speed control method according to claim 14, wherein
the object recognition error indicates a distance at which the moving body moves within a display delay time of the video data,
in calculation of the upper limit value, by using the display delay time and the allowable maximum value, a traveling speed satisfying a condition that a distance at which the moving body moves within the display delay time becomes equal to the allowable maximum value is calculated, and the calculated traveling speed is set as an upper limit value of the traveling speed, and
the display delay time includes at least one of a communication delay time related to packet transmission of the video data, a signal processing delay time of the video data, or an encoding delay time of the video data, and a video frame time interval of the video data.

17. The traveling speed control method according to claim 13, wherein
the video quality includes resolution and quantization accuracy of the video data,
the monitoring required condition indicates an allowable minimum value of an object recognition duration time, and
the object recognition duration time is defined as a time when a predetermined target object in the video data can be continuously recognized in time.

18. The traveling speed control method according to claim 17, wherein, in calculation of the upper limit value, by using a recognizable maximum distance of a predetermined target object to be determined according to the resolution and the quantization accuracy, and the allowable minimum value, a traveling speed satisfying a condition that a time required for the moving body to move at the recognizable maximum distance becomes equal to the allowable minimum value is calculated, and the calculated traveling speed is set as an upper limit value of the traveling speed.

* * * * *